(12) United States Patent
Gu et al.

(10) Patent No.: US 10,892,917 B2
(45) Date of Patent: Jan. 12, 2021

(54) CHANNEL CORRECTION METHOD AND APPARATUS, AND COMMUNICATIONS SYSTEM

(71) Applicant: Huawei Technologies Co., Ltd., Guangdong (CN)

(72) Inventors: Xueqin Gu, Shenzhen (CN); Shengfeng Jiang, Shenzhen (CN); Qiqing Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/220,576

(22) Filed: Dec. 14, 2018

(65) Prior Publication Data

US 2019/0123939 A1     Apr. 25, 2019

Related U.S. Application Data

(63) Continuation of application No. PCT/CN2016/086252, filed on Jun. 17, 2016.

(51) Int. Cl.
*H04L 25/02* (2006.01)
*H04L 27/00* (2006.01)
(Continued)

(52) U.S. Cl.
CPC ......... *H04L 25/0228* (2013.01); *H04B 7/024* (2013.01); *H04B 17/21* (2015.01);
(Continued)

(58) Field of Classification Search
CPC ............ H04L 25/0228; H04L 25/0204; H04L 27/0014; H04L 27/2695; H04L 2027/0042; H04B 17/21; H04B 7/042
(Continued)

(56) References Cited

U.S. PATENT DOCUMENTS 9,544,105 B2 *  1/2017  Siomina ................ H04L 5/0032
9,961,681 B2 *  5/2018  Xue ..................... H04L 27/2278
(Continued)

FOREIGN PATENT DOCUMENTS

CN      103229471 A     7/2013
CN      104104420 A    10/2014
(Continued)

OTHER PUBLICATIONS

Office Action issued in Chinese Application No. 2018-564786 dated Jan. 7, 2020, 5 pages (with English translation).
(Continued)

*Primary Examiner* — Phong La
(74) *Attorney, Agent, or Firm* — Fish & Richardson P.C.

(57) ABSTRACT

A channel correction method, used for performing channel correction on radio frequency apparatuses in a network area, is provided. The radio frequency apparatuses are divided into at least one radio frequency apparatus group. A correction resource location is set for each radio frequency apparatus in the radio frequency apparatus group. These resource locations may be stored in a form of configuration information in base stations where the radio frequency apparatuses are located, so that the base station controls each of these radio frequency apparatuses to send a correction signal in a respective correction resource location based on the configuration information, and to implement, by using these correction signals, channel correction for the radio frequency apparatuses in the radio frequency apparatus group. The method can implement joint channel correction for a plurality of radio frequency apparatuses and improve correction efficiency.

20 Claims, 9 Drawing Sheets

(51) Int. Cl.
*H04L 5/00* (2006.01)
*H04J 11/00* (2006.01)
*H04B 7/024* (2017.01)
*H04B 17/21* (2015.01)
*H04L 27/26* (2006.01)

(52) U.S. Cl.
CPC ........ *H04J 11/0023* (2013.01); *H04L 5/0053* (2013.01); *H04L 25/0204* (2013.01); *H04L 27/0014* (2013.01); *H04L 27/2695* (2013.01); *H04L 2027/0042* (2013.01)

(58) Field of Classification Search
USPC .......................................................... 370/252
See application file for complete search history.

(56) References Cited

U.S. PATENT DOCUMENTS

| | | | | |
|---|---|---|---|---|
| 2004/0108878 | A1* | 6/2004 | Dosho | H03K 5/133 327/174 |
| 2010/0303015 | A1 | 12/2010 | Ko et al. | |
| 2015/0017927 | A1* | 1/2015 | Kim | H04B 17/318 455/67.13 |
| 2015/0078347 | A1* | 3/2015 | Yang | H04W 56/00 370/336 |
| 2015/0085690 | A1* | 3/2015 | Yi | H04L 25/0224 370/252 |
| 2015/0222335 | A1 | 8/2015 | Yilmaz et al. | |
| 2015/0305017 | A1* | 10/2015 | Fong | H04W 72/02 370/329 |
| 2016/0099762 | A1* | 4/2016 | Wu | H04L 25/0398 370/329 |
| 2016/0377694 | A1* | 12/2016 | Song | G01R 21/133 702/106 |
| 2017/0026100 | A1* | 1/2017 | Wang | H04W 72/12 |
| 2017/0033951 | A1* | 2/2017 | Zhang | H04L 25/0224 |
| 2017/0034829 | A1* | 2/2017 | Yang | H04L 5/0048 |
| 2017/0083475 | A1* | 3/2017 | Wu | G06F 13/124 |
| 2018/0006845 | A1* | 1/2018 | Kim | H04L 5/00 |
| 2018/0062775 | A1 | 3/2018 | Sawai et al. | |
| 2018/0316536 | A1* | 11/2018 | Ji | H04W 74/0833 |
| 2019/0141517 | A1* | 5/2019 | Li | H04W 8/183 |

FOREIGN PATENT DOCUMENTS

| | | |
|---|---|---|
| CN | 104243387 A | 12/2014 |
| CN | 105207723 A | 12/2015 |
| EP | 2894794 A1 | 7/2015 |
| EP | 2991412 A1 | 3/2016 |
| JP | 2008187552 A | 8/2008 |
| JP | 2010193189 A | 9/2010 |
| KR | 100935933 B1 | 1/2010 |
| KR | 20110117889 A | 10/2011 |
| WO | 2008034023 A1 | 3/2008 |
| WO | 2014129035 A1 | 8/2014 |
| WO | 2014202025 A1 | 12/2014 |

OTHER PUBLICATIONS

Extended European Search Report issued in European Application No. 16905095.2 dated May 6, 2019, 10 pages.
Office Action issued in Korean Application No. 2019-7000218 dated May 22, 2020, 11 pages (with English translation).
Office Action issued in Chinese Application No. 201680086167.1 dated Mar. 3, 2020, 17 pages (with English translation).

* cited by examiner

CHANNEL CORRECTION METHOD AND APPARATUS, AND COMMUNICATIONS SYSTEM

CROSS-REFERENCE TO RELATED APPLICATIONS

This application is a continuation of International Application No. PCT/CN2016/086252 filed on Jun. 17, 2016, the disclosure of which is hereby incorporated by reference in its entirety.

TECHNICAL FIELD

Embodiments of the present application relate to the field of wireless communications technologies, and in particular, to a channel correction method and apparatus, and a communications system.

BACKGROUND

In a wireless communications system, overlapping cell coverage may cause interference to a terminal. Referring to FIG. 1, a base station 111 and a base station 112 have an overlapping coverage area, and a terminal in the overlapping coverage area may be interfered with by a base station other than a serving base station of the terminal. Dashed lines in the figure represent interference, and solid lines represent desired signals. For example, a serving base station of a terminal 113 is the base station 111, and the terminal 113 is interfered with by the base station 112. A serving base station of a terminal 114 is the base station 112, and the terminal 113 is interfered with by the base station 111.

With development of communications technologies, a distributed multiple-input multiple-output (DMIMO) technology has been introduced. In a DMIMO scenario, radio frequency apparatuses may be deployed separately. A plurality of radio frequency apparatuses with overlapping coverage may form a group. The radio frequency apparatuses in the group perform joint transmission for a terminal, and interference is transformed into energy. Referring to FIG. 2, compared with FIG. 1, the DMIMO technology is used to convert interference into desired signals, and transform interference into energy, so as to increase a system capacity and improve edge terminal experience.

Channel correction for the radio frequency apparatuses is a prerequisite for DMIMIO implementation. With channel correction, channels of radio frequency apparatuses in a group have a same delay, so that signals sent by the radio frequency apparatuses can be added in phase when arriving at a terminal, so as to enhance strength of downlink signals received by the terminal.

In an existing multiple-input multiple-output (MIMO) technology, a correction signal is sent in a single radio frequency apparatus, and channel correction is performed only on a single radio frequency apparatus. In other words, correction is performed only on a plurality of radio frequency channels in one radio frequency apparatus. The radio frequency channels in the radio frequency apparatus have a same clock source, a same clock oscillator, and a basically same external environment (such as temperature, light irradiation, and a wind direction), so amplitude and phase characteristics of each radio frequency channel change relatively slowly, and a change trend is basically the same. Therefore, a channel correction cycle in a single RRU is usually slow, and only needs to reach a minute level.

For channel correction in the DMIMO scenario, channel correction is performed between a plurality of radio frequency apparatuses. Due to impact of different environments where the radio frequency apparatuses are located, different optical fiber lengths, different clock sources, and the like, phases between the radio frequency apparatuses change fast, and change trends are inconsistent. An existing correction method can no longer meet performance requirements for DMIMO and requires faster channel correction.

SUMMARY

In view of this, embodiments of the present disclosure provide a channel correction method and apparatus, and a communications system, so as to improve channel correction efficiency.

According to a first aspect, a channel correction method is provided for performing channel correction on radio frequency apparatuses in a network area, where the radio frequency apparatuses in the network area are divided into at least one radio frequency apparatus group, each radio frequency apparatus group includes a plurality of radio frequency apparatuses, a correction path between the plurality of radio frequency apparatuses is reachable, configuration information is preset on a base station where a first radio frequency apparatus is located, where the configuration information is used to indicate a resource location where each radio frequency apparatus in a radio frequency apparatus group to which the first radio frequency apparatus belongs sends a correction signal, and the first radio frequency apparatus is any radio frequency apparatus in the network area; and the method is performed by the base station where the first radio frequency apparatus is located, and includes:

controlling, based on the configuration information in a correction cycle, the first radio frequency apparatus to send a first correction signal at a first resource location, and obtaining a first received signal, corresponding to the first correction signal, from a second radio frequency apparatus, where the first resource location is a resource location where the first radio frequency apparatus sends the correction signal, and the second radio frequency apparatus is a radio frequency apparatus in the radio frequency apparatus group to which the first radio frequency apparatus belongs;

obtaining, based on the configuration information in the correction cycle, a second received signal at a second resource location through the first radio frequency apparatus, where the second received signal is corresponding to a second correction signal, and the second resource location is a resource location where the second radio frequency apparatus sends the second correction signal; and compensating a channel of the first radio frequency apparatus based on the first correction signal, the second correction signal, the first received signal, and the second received signal.

According to a second aspect, a channel correction apparatus is provided for performing channel correction on radio frequency apparatuses in a network area, where the radio frequency apparatuses in the network area are divided into at least one radio frequency apparatus group, each radio frequency apparatus group includes a plurality of radio frequency apparatuses, a correction path between the plurality of radio frequency apparatuses is reachable, configuration information is preset on a base station where a first radio frequency apparatus is located, where the configuration information is used to indicate a resource location where each radio frequency apparatus in a radio frequency apparatus group to which the first radio frequency apparatus belongs sends a correction signal, and the first radio frequency apparatus is any radio frequency apparatus in the network area; and the channel correction apparatus is located in the base station where the first radio frequency apparatus is located, and includes units or means for performing the steps in the first aspect. For example, the channel correction apparatus includes: a first control unit, configured to control, based on the configuration information in a correction cycle, the first radio frequency apparatus to send a first correction signal at a first resource location, and obtain a first received signal, corresponding to the first correction signal, from a second radio frequency apparatus, where the first resource location is a resource location where the first radio frequency apparatus sends the correction signal, and the second radio frequency apparatus is a radio frequency apparatus in the radio frequency apparatus group to which the first radio frequency apparatus belongs; an obtaining unit, configured to obtain, based on the configuration information in the correction cycle, a second received signal at a second resource location through the first radio frequency apparatus, where the second received signal is corresponding to a second correction signal, and the second resource location is a resource location where the second radio frequency apparatus sends the second correction signal; and a compensation unit, configured to compensate a channel of the first radio frequency apparatus based on the first correction signal, the second correction signal, the first received signal, and the second received signal. The units or means may be implemented in a software manner or in a hardware manner, or may be implemented by using a combination of software and hardware.

According to a third aspect, a communications system is provided, including at least one base station, where radio frequency apparatuses of the at least one base station are divided into at least one radio frequency apparatus group, each radio frequency apparatus group includes a plurality of radio frequency apparatuses, a correction path between the plurality of radio frequency apparatuses is reachable, configuration information is preset on a base station where a first radio frequency apparatus is located, where the configuration information is used to indicate a resource location where each radio frequency apparatus in a radio frequency apparatus group to which the first radio frequency apparatus belongs sends a correction signal, the first radio frequency apparatus is any radio frequency apparatus in a network area, and the base station where the first radio frequency apparatus is located includes the channel correction apparatus in the second aspect.

According to a fourth aspect, a program is provided, and the program is used to execute the method in the first aspect when being executed by a processor.

According to a fifth aspect, a program product is provided, such as a computer readable storage medium, including the program in the fourth aspect.

It can be learned that in the foregoing aspects, the radio frequency apparatuses in the network area are grouped, and a correction resource location is preset for each radio frequency apparatus in a radio frequency apparatus group. In this way, each radio frequency apparatus in the group sends a correction signal at its own correction resource location based on the configuration information, and receives the correction signal at correction resource locations of some or all the other radio frequency apparatuses. There is no need to configure a correction resource each time, saving a large amount of configuration signaling and improving channel correction efficiency.

That a correction path between the plurality of radio frequency apparatuses is reachable means that channel correction between any two radio frequency apparatuses in a radio frequency apparatus group may be directly performed or may be performed through channel correction between the two radio frequency apparatuses and an intermediate radio frequency apparatus. There may be one or more intermediate radio frequency apparatuses.

In one implementation, there is an intermediate radio frequency apparatus in the radio frequency apparatus group. For example, in the foregoing aspects, the radio frequency apparatus group to which the first radio frequency apparatus belongs includes a third radio frequency apparatus, and the third radio frequency apparatus implements channel correction with the first radio frequency apparatus through the second radio frequency apparatus or a fourth radio frequency apparatus.

In one implementation, there may be a plurality of radio frequency apparatuses, in the radio frequency apparatus group, that concurrently receive a correction signal sent by a radio frequency apparatus. Compared with a pairwise serial channel correction manner in the prior art, this method can further improve correction efficiency. For example, in the foregoing aspects, the radio frequency apparatus group to which the first radio frequency apparatus belongs may include a plurality of second radio frequency apparatuses, and the plurality of second radio frequency apparatuses concurrently receive the first correction signal, and second resource locations of the plurality of second radio frequency apparatuses are different from each other.

In one implementation, correction resources between radio frequency apparatus groups can be planned based on isolation, so that a correction resource is reused between radio frequency apparatus groups with high isolation. For example, in the foregoing aspects, when the radio frequency apparatuses in the network area are divided into a plurality of radio frequency apparatus groups, the plurality of radio frequency apparatus groups include a first radio frequency apparatus group and a second radio frequency apparatus group, isolation between the first radio frequency apparatus group and the second radio frequency apparatus group meets a preset requirement, and a radio frequency apparatus in the first radio frequency apparatus group and a radio frequency apparatus in the second radio frequency apparatus group use a same resource to send a correction signal. For another example, the plurality of radio frequency apparatus groups include a third radio frequency apparatus group and a fourth radio frequency apparatus group, isolation between the third radio frequency apparatus group and the fourth radio frequency apparatus group does not meet a preset requirement, and a radio frequency apparatus in the third radio frequency apparatus group and a radio frequency apparatus in the fourth radio frequency apparatus group use different resources to send a correction signal.

Isolation is a degree of mutual interference between two radio frequency apparatuses. Lower isolation indicates more interference, and higher isolation indicates less interference. Isolation may be reflected by using signal strength. For example, a radio frequency apparatus A sends a signal, and a radio frequency apparatus B receives a signal. Strength of the received signal reflects isolation between the radio frequency apparatus A and the radio frequency apparatus B.

That isolation between radio frequency apparatus groups meets a preset requirement means that isolation between each radio frequency apparatus in one group of two radio frequency apparatus groups and each radio frequency apparatus in the other group of the two radio frequency apparatus groups meets the preset requirement.

In one implementation, the radio frequency apparatuses in the network area may be grouped based on a grouping factor. The grouping factor may include one or more of the following factors: an isolation requirement, a maximum spacing between the radio frequency apparatuses, a group size, and a maximum quantity of layers. Preferably, a combination of an isolation requirement and one or more other factors may be selected for grouping.

After the grouping is completed, a group identifier (ID) may be assigned to each radio frequency apparatus group, and the group ID may be used during allocation of correction resources. For example, in the foregoing aspects, a radio frequency apparatus group ID meets the following requirements: group identifier mod N operation results of radio frequency apparatus groups, between which isolation meets a preset requirement, are the same; and group ID mod N operation results of radio frequency apparatus groups, between which isolation does not meet a preset requirement, are different, where N represents a quantity of radio frequency apparatus groups in a correction cycle. A criterion for the allocation of the correction resources includes: a same correction resource is allocated to radio frequency apparatus groups whose group ID mod N operation results are the same, and different correction resources are allocated to radio frequency apparatus groups whose group ID mod N operation results are different. A time resource is used as an example. The correction resources for the radio frequency apparatus groups whose group ID mod N operation results are the same are allocated in a same time location, and the correction resources for the radio frequency apparatus groups whose group ID mod N operation results are different are allocated in different time locations. In this way, the allocation of the correction resources can be simplified after the group IDs are allocated, so that the allocation of the correction resources becomes faster, and interference caused by a correction resource conflict can be effectively reduced.

In one implementation, a plurality of correction orders may be designed, and a correction order corresponding to highest correction efficiency is selected as an optimal correction path based on correction results generated on a basis of the plurality of correction orders. The optimal correction path is used in a subsequent correction process to further improve correction efficiency. For example, the method provided in the first aspect may further include a process of selecting an optimal correction path, including:

controlling, by the base station where the first radio frequency apparatus is located, the first radio frequency apparatus to send correction signals in a plurality of preset orders in a plurality of correction cycles, where each order indicates an order for sending correction signals by radio frequency apparatuses in the radio frequency apparatus group to which the first radio frequency apparatus belongs;

selecting, by the base station where the first radio frequency apparatus is located, an order corresponding to highest correction efficiency as an optimal correction path; and performing, by the base station where the first radio frequency apparatus is located, subsequent correction based on the optimal correction path.

For another example, the apparatus provided in the second aspect further includes units or means for performing the steps in the process of selecting an optical correction path. For example, the apparatus includes: a second control unit, configured to control the first radio frequency apparatus to send correction signals in a plurality of preset orders in a plurality of correction cycles, where each order indicates an order for sending correction signals by radio frequency apparatuses in the radio frequency apparatus group to which the first radio frequency apparatus belongs; a selection unit, configured to select an order corresponding to highest correction efficiency as an optimal correction path; and a trigger unit, configured to trigger subsequent correction to be performed based on the optimal correction path.

In one implementation, the correction cycle may be further divided into a plurality of time periods, and one or more of the time periods may be used to perform correction on a specific parameter. In this way, hierarchical correction can be implemented, so that a faster correction cycle for a specific parameter can be achieved, and correction efficiency can be further improved. For example, in the foregoing aspects, the correction cycle includes at least one correction sub-cycle, where the correction sub-cycle is a time period in the correction cycle, and the correction sub-cycle is used for performing correction on a specific parameter.

Further, correction on the specific parameter may be performed between the plurality of radio frequency apparatus groups in a same correction cycle by using different frequency resources. For example, in the foregoing aspects, when the radio frequency apparatuses in the network area are divided into a plurality of radio frequency apparatus groups, the plurality of radio frequency apparatus groups include the radio frequency apparatus groups that perform correction on a specific parameter in a same correction cycle by using different frequency resources.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may derive other drawings from these accompanying drawings without creative efforts.

DETAILED DESCRIPTION

To make the objectives, technical solutions, and advantages of the present disclosure clearer, the following describes the technical solutions in the embodiments of the present disclosure with reference to the accompanying drawings. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The following describes some terms in this application for ease of understanding by a person skilled in the art.

(1) A terminal, also referred to as user equipment (UE), is a device providing voice and/or data connectivity to a user, for example, a handheld device or an in-vehicle device with a wireless connection function. A common terminal includes, for example, a mobile phone, a tablet computer, a notebook computer, a palmtop computer, a mobile Internet device (MID), or a wearable device such as a smartwatch, a smart band, or a pedometer.

(2) A base station, also referred to as a radio access network (RAN) device, is a device that connects a terminal to a wireless network, and includes but is not limited to an evolved Node B (eNB), a radio network controller (RNC), a Node B (NB), a base station controller (BSC), a base transceiver station (BTS), a home evolved NodeB or a home NodeB (for example, a Home evolved NodeB or a Home Node B, HNB), or a baseband unit (BBU). In addition, the base station may include a WiFi access point (AP), or the like.

(3) Isolation is used to reflect a degree of mutual interference between two radio frequency apparatuses. Lower isolation indicates more interference, and higher isolation indicates less interference.

(4) A correction resource refers to a resource used to send a correction signal.

(5) "A plurality of" refers to two or more than two, for example, "a plurality of" refers to two or more than two. The term "and/or" describes an association relationship of associated objects and represents that three relationships may exist. For example, A and/or B may represent the following three cases: Only A exists, both A and B exist, and only B exists. The character "/" generally indicates an "or" relationship between the associated objects before and after the character.

Figure 1:
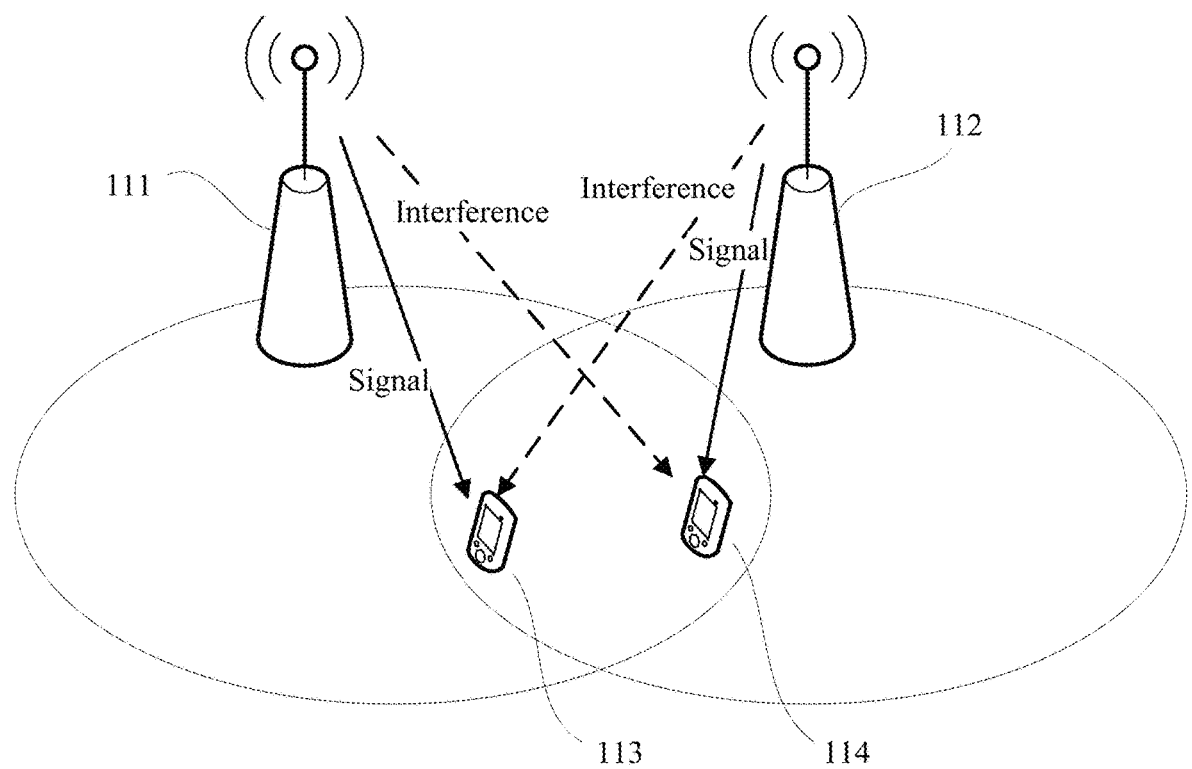
FIG. 1 is a schematic diagram of interference on a terminal that is caused by overlapping cell coverage.
Figure 2:
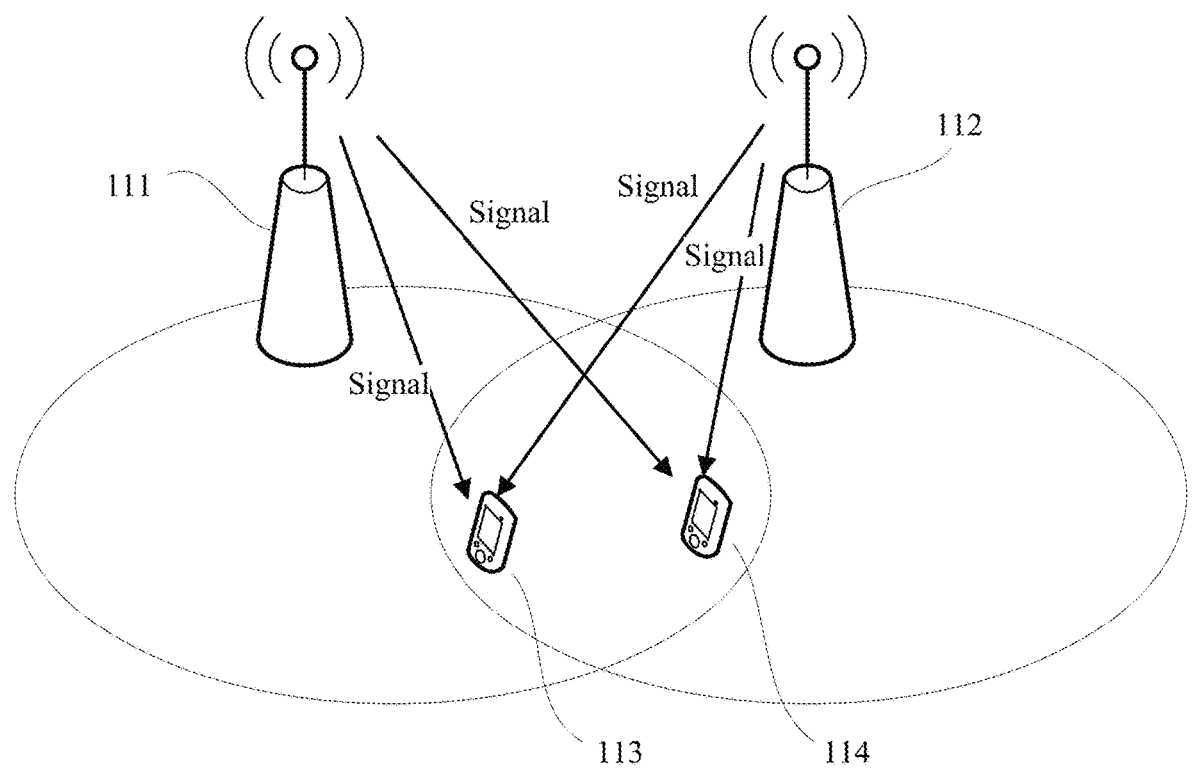
FIG. 2 is a schematic diagram of a DMIMO scenario.
Figure 3:
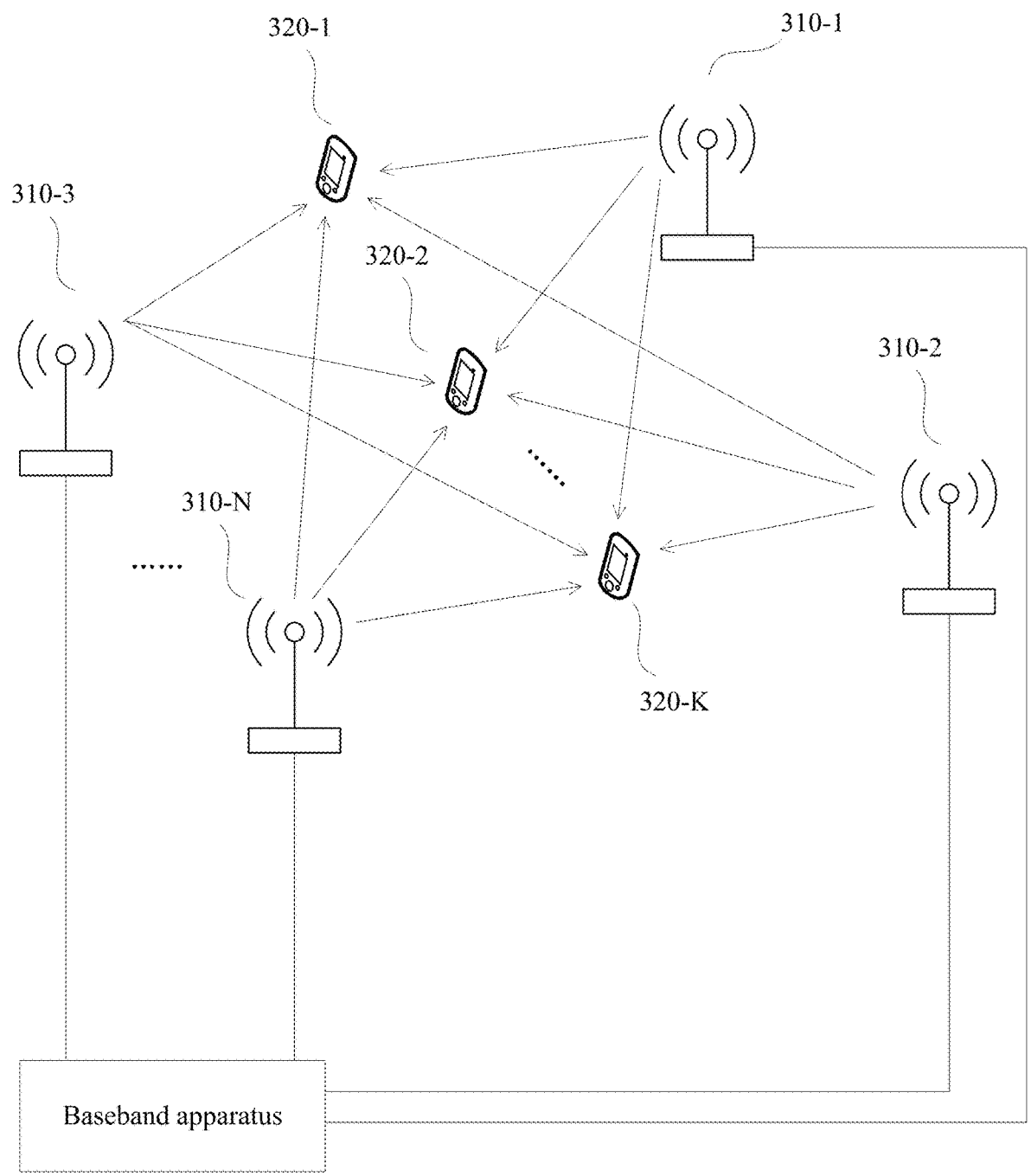
FIG. 3 is a schematic diagram of a communications system according to an embodiment of this application.

Referring to FIG. 3, FIG. 3 is a schematic diagram of a communications system according to an embodiment of this application. As shown in FIG. 3, the communications system includes a plurality of radio frequency apparatuses 310-1 to 310-N, which are arranged in a distributed manner. In addition, these radio frequency apparatuses may be arranged away from a baseband apparatus, that is, arranged at a specific distance away from the baseband apparatus, and each baseband apparatus may be connected to one or more radio frequency apparatuses. The baseband apparatus 330 in the figure is a collective name for baseband apparatuses corresponding to these radio frequency apparatuses and is not shown separately. The baseband apparatuses corresponding to these radio frequency apparatuses may be a same baseband apparatus, or may be different baseband apparatuses, and some of the radio frequency apparatuses may be connected to a same baseband apparatus. In addition, the baseband apparatuses corresponding to these radio frequency apparatuses may be arranged as a baseband cloud in a centralized manner. For example, the radio frequency apparatus is a remote radio unit (RRU), and the baseband apparatus is a BBU. These RRUs are arranged away from BBUs through optical fibers, and the BBUs corresponding to these RRUs may be arranged together to form a BBU cloud (Cloud BB).

Within coverage of the radio frequency apparatuses 310-1 to 310-N, a plurality of terminals 320-1 to 320-K access a wireless network. It may be determined, based on a quantity of antennas of the N radio frequency apparatuses 310-1 to 310-N, that a quantity of transmit antenna channels is M, and a channel matrix is M*K. The channel matrix is transposed, and a transposed matrix is multiplied by the channel matrix, to obtain a K-dimensional transceiver matrix, where N, M, and K are all positive integers. The K-dimensional transceiver matrix may form K orthogonal transmission vectors, and each orthogonal transmission vector serves a terminal. A base station uses the orthogonal transmission vectors to weight terminal data, and orthogonal terminal data is jointly sent concurrently, without interference to each other.

It can be learned that when the foregoing communications system operates in a DMIMO scenario, channel correction between the plurality of radio frequency apparatuses is required to make channels of the radio frequency apparatuses have a same delay, so that signals sent by the radio frequency apparatuses can be added in phase when the signals arrive at the terminal.

A current correction manner is correction between two of the plurality of radio frequency apparatuses, and correction is performed between each pair of radio frequency apparatuses in series. If there is a relatively large quantity of radio frequency apparatuses, a correction cycle can only be at a minute (min) level. However, an air interface channel of a radio frequency apparatus is greatly affected by an external environment (such as temperature, light irradiation, and a wind direction), and lengths of optical fibers connected to the baseband apparatuses, clock sources, and the like may also be different. Therefore, after each correction, a phase difference between the radio frequency apparatuses possibly changes greatly in a short time. As a result, a current correction method can no longer meet a DMIMO performance requirement. This requires faster channel correction.

In consideration of the above problem, a channel correction scheme provided in an embodiment of this application can faster resolve a channel correction problem. In this embodiment of this application, radio frequency apparatuses in a network area are divided into at least one radio frequency apparatus group (also referred to as a radio frequency apparatus cluster). The radio frequency apparatus group includes a plurality of radio frequency apparatuses, and a correction resource location, that is a resource location where a correction signal is sent, is set for each radio frequency apparatus in the radio frequency apparatus group. These resource locations may be stored in a form of configuration information in base stations where the radio frequency apparatuses are located, so that the base stations where the radio frequency apparatuses are located control each of these radio frequency apparatuses to send a correction signal in a respective correction resource location based on the configuration information, and to implement, by using these correction signals, channel correction for the radio frequency apparatuses in the radio frequency apparatus group. A person skilled in the art can understand that these correction signals may be same signals. Although terms such as a first correction signal and a second correction signal are given below, the terms are used to distinguish that the correction signals are sent by different radio frequency apparatuses, but not used to indicate that the correction signals are different. Certainly, the correction signals may alternatively be different, but this causes system overheads. Each radio frequency apparatus needs to know in advance a correction signal sent by another radio frequency apparatus.

Figure 4:
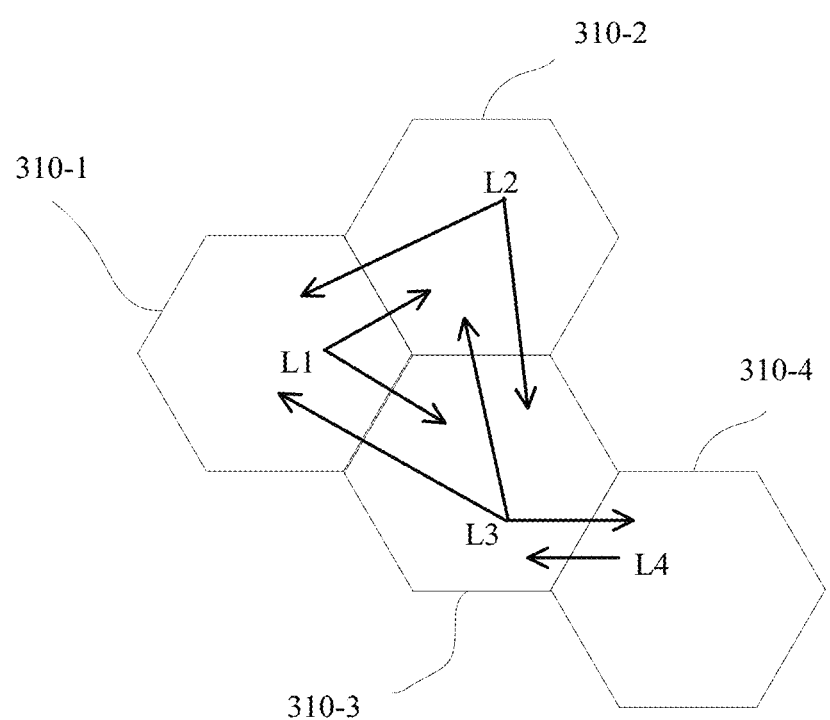
FIG. 4 is a schematic diagram of a scenario of a channel correction method according to an embodiment of this application.

In the communications system shown in FIG. 3, for example, N is 4, and the radio frequency apparatuses 310-1 to 310-4 are grouped into a same radio frequency apparatus group. A correction resource location of each radio frequency apparatus in the radio frequency apparatus group is preset to the base station where the radio frequency apparatus is located. In this way, the base station of each radio frequency apparatus can control the corresponding radio frequency apparatus to send a correction signal on a preset correction resource, and a radio frequency apparatus, in the group, that can receive the correction signal can receive the correction signal. Then, channel correction can be performed by using correction signals sent to each other by the two radio frequency apparatuses and received signals corresponding to the correction signals. With reference to FIG. 4, in FIG. 4, a coverage area of each radio frequency apparatus is represented by a hexagon, and each coverage area represents the radio frequency apparatus. The radio frequency apparatus 310-1 sends a correction signal on a correction resource L1, and the radio frequency apparatuses 310-2 and 310-3 receive the correction signal; the radio frequency apparatus 310-2 sends a correction signal on a correction resource L2, and the radio frequency apparatuses 310-1 and 310-3 receive the correction signal; the radio frequency apparatus 310-3 sends a correction signal on a correction resource L3, and the radio frequency apparatuses 310-1, 310-2, and 310-4 receive the correction signal; and the radio frequency apparatus 310-4 sends a correction signal on a correction resource L4, and the radio frequency apparatus 310-3 receives the correction signal. In this way, the correction signals sent to each other can be used to perform channel correction between the radio frequency apparatus 310-1 and the radio frequency apparatus 310-2, between the radio frequency apparatus 310-1 and the radio frequency apparatus 310-3, between the radio frequency apparatus 310-2 and the radio frequency apparatus 310-3, and between the radio frequency apparatus 310-3 and the radio frequency apparatus 310-4.

It should be noted that the radio frequency apparatus receives a correction signal, but the signal received by the radio frequency apparatus is not the signal that is originally sent. Instead, the received signal is a signal that is obtained through weighting by using a transmission channel and a radio frequency channel of the radio frequency apparatus, and this signal is referred to as a received signal corresponding to a correction signal. When the channel correction is being performed, the received signal corresponding to the correction signal is used for the channel correction.

In the prior art, correction is performed between two of the plurality of radio frequency apparatuses in series. For example, a correction resource between the radio frequency apparatus 310-1 and the radio frequency apparatus 310-2 is configured first, the radio frequency apparatus 310-1 and the radio frequency apparatus 310-2 send correction signals to each other, and channel correction is performed by using the correction signals sent to each other. Then, a correction resource between the radio frequency apparatus 310-1 and the radio frequency apparatus 310-3 is configured, the radio frequency apparatus 310-1 and the radio frequency apparatus 310-3 send correction signals to each other, and channel correction is performed by using received signals corresponding to the correction signals sent to each other. Channel correction between the radio frequency apparatus 310-2 and the radio frequency apparatus 310-3, and channel correction between the radio frequency apparatus 310-3 and the radio frequency apparatus 310-4 are similar. It can be learned that configuration signaling needs to be continuously generated in this process. As a result, large configuration signaling overheads are caused, efficiency is low, and a time required is relatively long. However, in this embodiment of this application, the radio frequency apparatuses are grouped, and the correction resources of the radio frequency apparatuses in each radio frequency apparatus group are preset. When a radio frequency apparatus sends a correction signal, some or all of the other radio frequency apparatuses can receive the correction signal concurrently. This can greatly reduce configuration signaling overheads, thereby improving channel correction efficiency.

It should be noted that no channel correction is directly performed between the radio frequency apparatus 310-1 and the radio frequency apparatus 310-4. However, the radio frequency apparatus 310-4 performs correction on a channel of the radio frequency apparatus 310-3, and the radio frequency apparatus 310-3 performs correction on a channel of the radio frequency apparatus 310-1, which is equivalent to that the radio frequency apparatus 310-4 performs channel correction on the radio frequency apparatus 310-1. In addition, the radio frequency apparatus 310-1 performs correction on the channel of the radio frequency apparatus 310-3, and the radio frequency apparatus 310-3 performs correction on a channel of the radio frequency apparatus 310-4, which is equivalent to that the radio frequency apparatus 310-1 performs channel correction on the radio frequency apparatus 310-4. Therefore, this is equivalent to that channel correction is performed between the radio frequency apparatus 310-1 and the radio frequency apparatus 310-4, further improving channel correction efficiency.

It can be learned that correction signals of any two of the radio frequency apparatuses in the radio frequency apparatus group are reachable to each other. Alternatively, this requirement may not be met, and only a correct path needs to be reachable. That the correction path is reachable means that channel correction between any two radio frequency apparatuses in the radio frequency apparatus group may be directly performed or may be performed through channel correction between the two radio frequency apparatuses and an intermediate radio frequency apparatus. There may be one or more intermediate radio frequency apparatuses.

The foregoing is merely used as an example. A correction relationship between radio frequency apparatuses in a radio frequency apparatus group is not limited in this embodiment of this application. In other words, when a radio frequency apparatus (for example, a first radio frequency apparatus) sends a correction signal, all the other radio frequency apparatuses can receive the correction signal, or some of the other radio frequency apparatuses (for example, a second radio frequency apparatus and a third radio frequency apparatus) may receive the correction signal, and a radio frequency apparatus (for example, a fourth radio frequency apparatus) that does not receive the correction signal implements channel correction with the first radio frequency apparatus through a radio frequency apparatus (for example, the third radio frequency apparatus) that can receive the signal.

It can be learned that in the foregoing embodiment, the radio frequency apparatuses in a network area are grouped, and a correction resource location is configured for each radio frequency apparatus in a radio frequency apparatus group. In this way, each radio frequency apparatus in the group sends a correction signal in its own correction resource location based on the configuration information, and receives the correction signal in correction resource locations of some or all the other radio frequency apparatuses. Compared with a pairwise channel correction manner in the prior art, in this method, there is no need to configure a correction resource each time, saving a large amount of configuration signaling and improving channel correction efficiency. A larger quantity of radio frequency apparatuses in the group indicates more obvious improvement of correction efficiency. In addition, the radio frequency apparatuses in the group can perform channel correction concurrently, further improving the correction efficiency. After verification is performed, a correction cycle can be shortened to a second level in this manner. This provides a performance basis for a scenario where there is a relatively high requirement for a channel correction cycle, such as a DMIMO scenario.

When there are a plurality of radio frequency apparatus groups in an entire network area, configuration information of these radio frequency apparatus groups may be planned all at once. This can help better plan correction resources between the radio frequency apparatus groups. For example, when configuration is performed for the radio frequency apparatus groups, isolation between all the radio frequency apparatus groups may be comprehensively considered, and correction resources are planned based on the isolation. A correction resource is reused between groups with high isolation, in other words, a same resource is used to send correction signals, so that resource saving can be achieved. In addition, configuration information is planned and set in a corresponding base station all at once. This can reduce overheads of configuration messages required when the base station performs channel correction in a pairwise manner.

Figure 5:
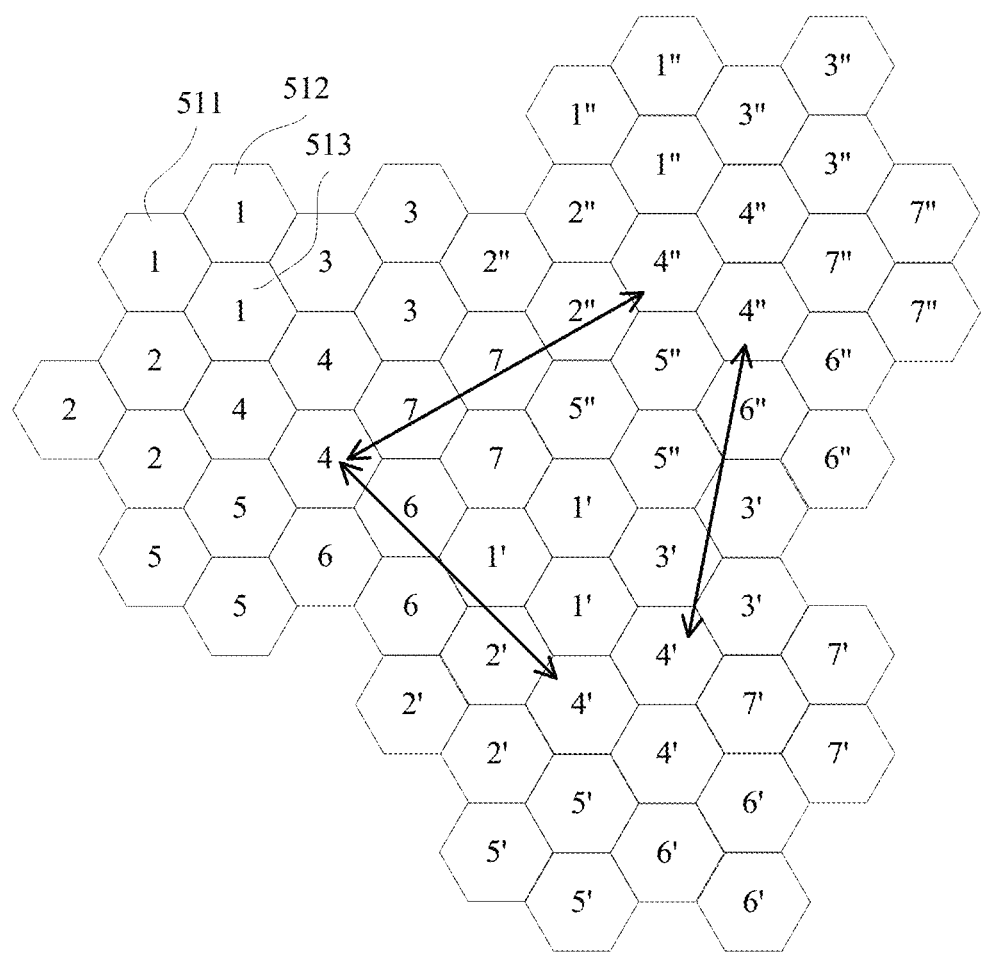
FIG. 5 is a schematic diagram of a scenario of another channel correction method according to an embodiment of this application.

Referring to FIG. 5, FIG. 5 is a schematic diagram of a scenario of a channel correction method according to an embodiment of this application. As shown in FIG. 5, there are a plurality of radio frequency apparatuses in a network area. Each hexagon represents a coverage area of one radio frequency apparatus, and the radio frequency apparatuses are grouped based on that each hexagon may represent one radio frequency apparatus. Radio frequency apparatuses in a same group are denoted by a same number, and the number includes a basic number and a superscript. Isolation between groups with a same basic number and different superscripts is relatively large, and a correction resource may be reused, in other words, a same resource is used to send correction signals. For example, as shown by arrows in the figure, radio frequency apparatus groups numbered 4, 4', and 4" may reuse a correction resource. The radio frequency apparatuses in this area are divided into a plurality of groups, and there are a plurality of radio frequency apparatuses in each group. For simplicity herein, an example that there are three radio frequency apparatuses in each group is used. In actual application, more radio frequency apparatuses may be included.

For a same radio frequency apparatus group, a resource location where a radio frequency apparatus in the radio frequency apparatus group sends a correction signal may be set. For example, for a radio frequency apparatus group 1, a radio frequency apparatus 511 sends a correction signal at a first resource location, a radio frequency apparatus 512 sends a correction signal at a second resource location, and a radio frequency apparatus 513 sends a correction signal in a third resource location. Information about these resource locations is stored in a form of configuration information in a base station where the radio frequency apparatuses 511, 512, and 513 are located. The radio frequency apparatuses 511, 512, and 513 may be located in a same base station or different base stations. That the radio frequency apparatuses 511, 512, and 513 are located in different base stations may mean that some of the radio frequency apparatuses 511, 512, and 513 may be located in different base stations or all the radio frequency apparatuses 511, 512, and 513 may be located in different base stations. Alternatively, the radio frequency apparatuses 511, 512, and 513 may be located in different BBUs, and these BBUs are placed in a centralized manner to constitute a BBU cloud.

A base station where the radio frequency apparatus 511 is located controls, based on the stored configuration information, the radio frequency apparatus 511 to send a correction signal at the first resource location. Base stations where the radio frequency apparatuses 512 and 513 are located obtain, based on the stored configuration information, received signals corresponding to the correction signal at the first resource location through the radio frequency apparatuses 512 and 513. The base stations where the radio frequency apparatuses 512 and 513 are located send, to the radio frequency apparatus 511, the received signals received by the radio frequency apparatuses 512 and 513. Then, the base station where the radio frequency apparatus 511 is located obtains, at the second resource location based on the stored configuration information through the radio frequency apparatus 511, a received signal corresponding to the correction signal sent by the radio frequency apparatus 512, and then performs channel correction between the radio frequency apparatus 511 and the radio frequency apparatus 512 based on the correction signals sent by the radio frequency apparatus 511 and the radio frequency apparatus 512 and the received signals of these correction signals. Similarly, the base station where the radio frequency apparatus 511 is located obtains, at the third resource location based on the stored configuration information through the radio frequency apparatus 511, a received signal corresponding to the correction signal sent by the radio frequency apparatus 513, and performs channel correction between the radio frequency apparatus 511 and the radio frequency apparatus 513. A channel correction process for the radio frequency apparatus 512 and the radio frequency apparatus 513 is the same as that in the foregoing description, and details are not repeated herein.

It can be learned that in this application, parallel channel correction can be performed between the radio frequency apparatuses in the same group, thereby improving channel correction efficiency. In addition, a same correction resource can also be used between groups with high isolation. In this way, from the perspective of an entire network, more improvement of correction efficiency is achieved.

The foregoing channel correction method may be implemented by controlling, by the base station based on the preset configuration information, the radio frequency apparatus in the base station to receive and send a correction signals. Details are described below with reference to FIG. 6.

Figure 6:
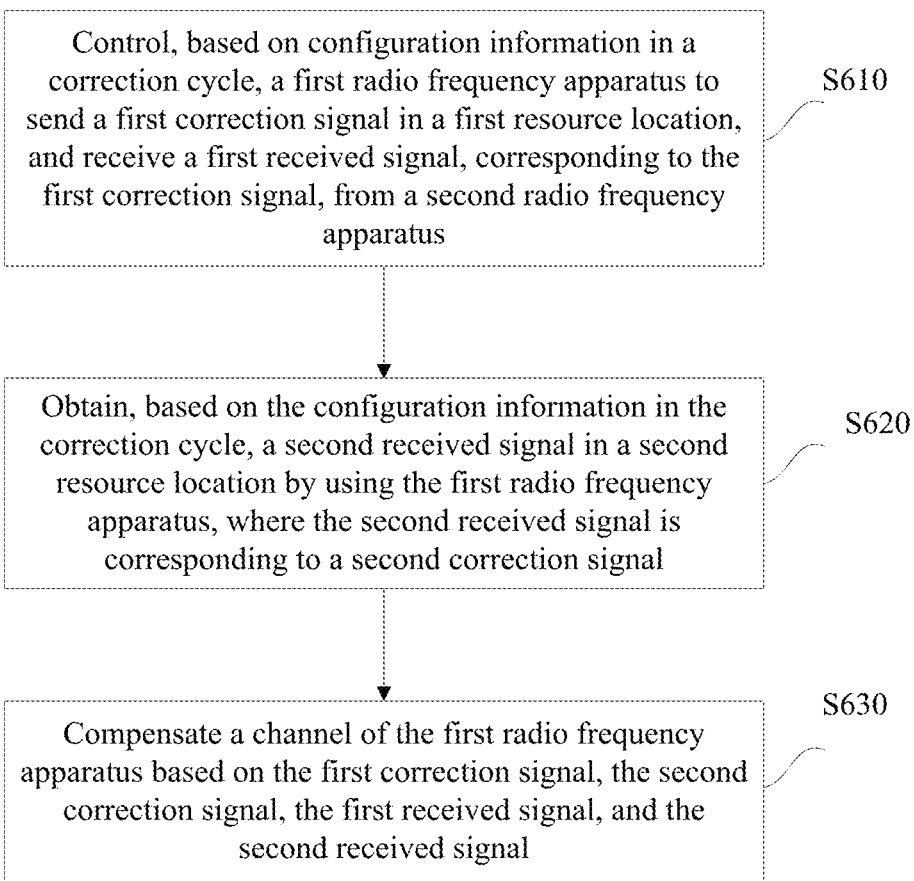
FIG. 6 is a flowchart of a channel correction method according to an embodiment of this application.

Referring to FIG. 6, FIG. 6 is a flowchart of a channel correction method according to an embodiment of this application. The channel correction method is used for performing channel correction on radio frequency apparatuses in a network area. The radio frequency apparatuses in the network area are divided into at least one radio frequency apparatus group. Each radio frequency apparatus group includes a plurality of radio frequency apparatuses, and a correction path between the plurality of radio frequency apparatuses in the group is reachable. Configuration information is preset on a base station where any radio frequency apparatus is located, and the configuration information is used to indicate a resource location where each radio frequency apparatus in a radio frequency apparatus group to which the radio frequency apparatus belongs sends a correction signal. An example where the any radio frequency apparatus is a first radio frequency apparatus is used. The method is performed by a base station where the first radio frequency apparatus is located. As shown in FIG. 6, the method includes the following steps.

S610: Control, based on the configuration information in a correction cycle, the first radio frequency apparatus to send a first correction signal at a first resource location, and obtain a first received signal, corresponding to the first correction signal, from a second radio frequency apparatus, where the first resource location is a resource location where the first radio frequency apparatus sends the correction signal, and the second radio frequency apparatus is a radio frequency apparatus in a radio frequency apparatus group to which the first radio frequency apparatus belongs.

S620: Obtain, based on the configuration information in the correction cycle, a second received signal at a second resource location through the first radio frequency apparatus, where the second received signal is corresponding to a second correction signal, and the second resource location is a resource location where the second radio frequency apparatus sends the second correction signal.

S630: Compensate a channel of the first radio frequency apparatus based on the first correction signal, the second correction signal, the first received signal, and the second received signal.

When the first radio frequency apparatus and the second radio frequency apparatus are located in a same base station, the base station may directly obtain the first received signal locally. That the first radio frequency apparatus and the second radio frequency apparatus are located in a same base station includes a case that the first radio frequency apparatus and the second radio frequency apparatus are located in a same baseband apparatus, or a case that the first radio frequency apparatus and the second radio frequency apparatus are located in different baseband apparatuses. When the first radio frequency apparatus and the second radio frequency apparatus are located in the same baseband apparatus, the first received signal may be obtained directly; when the first radio frequency apparatus and the second radio frequency apparatus are located in different baseband apparatuses, a baseband apparatus where the first radio frequency apparatus is located receives the first received signal from a baseband apparatus where the second radio frequency apparatus is located. When the first radio frequency apparatus and the second radio frequency apparatus are located in different base stations, a base station where the first radio frequency apparatus is located may obtain the first received signal from a base station where the second radio frequency apparatus is located. In a BBU cloud structure, the first radio frequency apparatus and the second radio frequency apparatus are located in different BBUs, but the BBUs are arranged in a centralized manner and can fast obtain received signals from each other.

The radio frequency apparatus group to which the first radio frequency apparatus belongs may include a plurality of second radio frequency apparatuses. Correction resources used by these second radio frequency apparatuses are different, in other words, the plurality of second radio frequency apparatuses separately send correction signals in their own second resource locations, and these second resource locations are different. The radio frequency apparatus group to which the first radio frequency apparatus belongs may further include a third radio frequency apparatus, and the third radio frequency apparatus implements channel correction with the first radio frequency apparatus through the second radio frequency apparatus or a fourth radio frequency apparatus. A quantity of third radio frequency apparatuses is not limited. There may be one or more third radio frequency apparatuses, and correction resource locations of the plurality of third radio frequency apparatuses are different.

A grouping factor may be selected as required for grouping the radio frequency apparatuses in the network area. For example, the grouping factor may include the following factors: an isolation requirement, a maximum spacing between the radio frequency apparatuses, a group size, a maximum quantity of layers, or the like. These factors may be combined for use, or one or more of these factors may be combined for use. Preferably, the isolation requirement is selected for use in combination with one or more of the other factors. In addition, if the isolation requirement is selected, the maximum quantity of layers does not need to be selected.

For example, when the factor, that is, the isolation requirement, is considered for performing grouping, radio frequency apparatuses that meet the isolation requirement may be grouped into one group. Isolation may be reflected by using signal strength. For example, a radio frequency apparatus A sends a signal, and a radio frequency apparatus B receives the signal. When strength of the received signal is less than a preset threshold, the radio frequency apparatuses A and B may be grouped into one radio frequency apparatus group. The signal strength may be reference signal received power (RSRP). When the factor, that is, the maximum spacing between the radio frequency apparatuses, is considered for performing grouping, radio frequency apparatuses at a distance within the maximum spacing (including the maximum distance) may be grouped into one radio frequency apparatus group. When the factor, that is, the group size of the radio frequency apparatuses, is considered for performing grouping, a quantity of radio frequency apparatuses in a radio frequency apparatus group does not exceed this size. When the factor, that is, the maximum quantity of layers, is considered for performing grouping, a maximum quantity of layers of neighboring cells between cells covered by radio frequency apparatuses in a radio frequency apparatus group does not exceed the maximum quantity of layers. For example, the maximum quantity of layers is 3, neighboring cells of a cell 1 include a cell 2, and neighboring cells of the cell 2 include a cell 4. If radio frequency apparatuses of the cell 1, the cell 2, and the cell 4 belong to a same radio frequency apparatus group, a radio frequency apparatus of a neighboring cell of the cell 4 cannot belong to the radio frequency apparatus group. Otherwise, the maximum quantity of layers exceeds 3. Certainly, the neighboring cells of the cell 1 and the cell 2 may alternatively include other cells, and the other cells also need to meet that a maximum quantity of layers of neighboring cells between cells covered by a same radio frequency apparatus group does not exceed 3.

A grouping algorithm is not limited in this application, and a person skilled in the art may perform grouping based on a selected grouping factor by using different algorithms. For example, radio frequency apparatuses that meet the grouping factor (such as a maximum spacing, a maximum quantity of layers, an isolation requirement, and a group size) in a pairwise manner may be obtained by traversing all combinations of the radio frequency apparatuses in the network area. A plurality of preset groups are obtained based on the radio frequency apparatuses that meet the grouping factor in a pairwise manner. A total gain in each preset group is evaluated to obtain a grouping scheme corresponding to an optimal total gain.

After the grouping is completed, a group identifier (ID) may be assigned to each group. The group ID may be used to implement allocation of correction resources between the radio frequency apparatus groups, so as to implement reuse and staggering of the correction resources. The correction resource may be a time resource, a frequency resource, or a space resource, and this is not limited in this application. A time resource is used as an example. A time resource location for correction may be allocated to a radio frequency apparatus group based on a group ID. Radio frequency apparatus groups with high isolation may use a same time resource to send correction signals; and time resources for radio frequency apparatus groups with low isolation are staggered, to avoid mutual interference caused when correction is performed simultaneously. For example, a group ID is assigned based on a specific criterion. A criterion may be: group ID mod N operation results of radio frequency apparatus groups with high isolation are the same; group ID mod N operation results of radio frequency apparatus groups with low isolation are different, where N represents a quantity of radio frequency apparatus groups that can be placed in a correction cycle. In this way, the allocation of the correction resources can be automatically implemented by using the group ID. For example, a criterion for allocating the correction resources between the radio frequency apparatus groups includes: a same correction resource is allocated to the radio frequency apparatus groups whose group ID mod N operation results are the same, and different correction resources are allocated to the radio frequency apparatus groups whose group ID mod N operation results are different. A time resource is used as an example. A same time location is allocated to the correction resources for the radio frequency apparatus groups whose group ID mod N operation results are the same, and different time locations are allocated to the correction resources for the radio frequency apparatus groups whose group ID mod N operation results are different.

It should be noted that, whether isolation meets a preset condition (or high-low) may be determined by using a preset isolation threshold. For example, if the isolation is greater than the threshold, the isolation meets the preset condition (or the isolation is high), and a resource may be reused to send correction signals; if the isolation is less than the threshold, the isolation does not meet the preset condition (or the isolation is low), and resources are staggered to send correction signals; if the isolation is equal to the threshold, a resource may be reused, or resources may be staggered.

Isolation between two radio frequency apparatus groups may be reflected by isolation between radio frequency apparatuses in the two radio frequency apparatus groups. For example, that isolation between radio frequency apparatus groups 1 and 4 does not meet the preset condition (or isolation is low) means that isolation between any radio frequency apparatus in the radio frequency apparatus group 1 and any radio frequency apparatus in the radio frequency apparatus group 4 is less than the threshold; that isolation between radio frequency apparatus groups 4 and 4' meets the preset condition (or isolation is high) means that isolation between any radio frequency apparatus in the radio frequency apparatus group 4 and any radio frequency apparatus in the radio frequency apparatus group 4' is greater than the threshold.

In addition, in a process of planning resources for the radio frequency apparatus groups in the network area, resources are staggered between the radio frequency apparatus groups based on a quantity of the radio frequency apparatus groups and one or more of time domain resources, frequency domain resources, and space domain resources. When a relatively small quantity of radio frequency apparatus groups are placed in the correction cycle, correction resources for these radio frequency apparatus groups may be directly divided in a time domain; when a relatively large quantity of radio frequency apparatus groups are placed in the correction cycle and the division in the time domain is insufficient, further division may be performed in a frequency domain on a basis of the time domain; when the division in the frequency domain is insufficient, further division may be performed in the space domain on a basis of the frequency domain. Resource division shown in the following Table 1 is used as an example.

TABLE 1

| Timeslot group $T_i$ | 0 | | 1 | | 2 | | 3 | |
|---|---|---|---|---|---|---|---|---|
| Frequency division-based group $F_j$ | 0 | 1 | 0 | 1 | 0 | 1 | 0 | 1 |
| Code division-based group $Z_k$ | 0 1 | 0 1 | 0 1 | 0 1 | 0 1 | 0 1 | 0 1 | 0 1 |
| Timeslot group $T_i$ | 4 | | 5 | | 6 | | 7 | |
| Frequency division-based group $F_j$ | 0 | 1 | 0 | 1 | 0 | 1 | 0 | 1 |
| Code division-based group $Z_k$ | 0 1 | 0 1 | 0 1 | 0 1 | 0 1 | 0 1 | 0 1 | 0 1 |

As shown in Table 1, the first row represents time domain resources. Assuming that the time domain resources may be divided for eight radio frequency apparatus groups. If correction resources need to be staggered only among eight or less radio frequency apparatus groups, the resources are staggered in the time domain to complete resource allocation. If correction resources need to be staggered among more than eight radio frequency apparatus groups, frequency domain resources may be further staggered in each block of time domain resource. For example, both a radio frequency apparatus group 1 and a radio frequency apparatus group 9 use a time domain resource 0, but frequency domain resources 0 and 1 are separately used in the frequency domain. Similarly, when resources need to be staggered for more radio frequency apparatus groups, and frequency domain resources are insufficient to meet a requirement, the resources may be further staggered through code division. Herein, this is merely an example of resource staggering, and is not used to limit this application. For example, the resources may be staggered in the frequency domain first, and then in the time domain.

In an embodiment, radio frequency apparatuses in a radio frequency apparatus group may alternatively be configured to perform switching of correction signal receiving and sending statuses in different orders, perform signal strength measurement, and select an optimal receiving/sending order as an optimal correction path based on measured signal strength. The optimal correction path is configured to a base station where a radio frequency apparatus in the radio frequency apparatus group is located, so that the base station controls, based on the optimal correction path, the radio frequency apparatus in the base station to send a correction signal. For example, radio frequency apparatuses in the radio frequency apparatus group 1 send correction signals in a plurality of orders, where the plurality of orders are as follows: order 1: a radio frequency apparatus 511, a radio frequency apparatus 512, and then a radio frequency apparatus 513; order 2: the radio frequency apparatus 511, the radio frequency apparatus 513, and then the radio frequency apparatus 512; order 3: the radio frequency apparatus 512, the radio frequency apparatus 511, and then the radio frequency apparatus 513; order 4: the radio frequency apparatus 512, the radio frequency apparatus 513, and then the radio frequency apparatus 511; order 5: the radio frequency apparatus 513, the radio frequency apparatus 512, and then the radio frequency apparatus 511; order 6: the radio frequency apparatus 513, the radio frequency apparatus 511, and then the radio frequency apparatus 512. The base stations where these radio frequency apparatuses are located separately control these radio frequency apparatuses to send correction signals in these orders, and an order corresponding to highest correction efficiency is selected as an optimal correction path. The optimal correction path is used for correction in a subsequent correction process.

Figure 7:
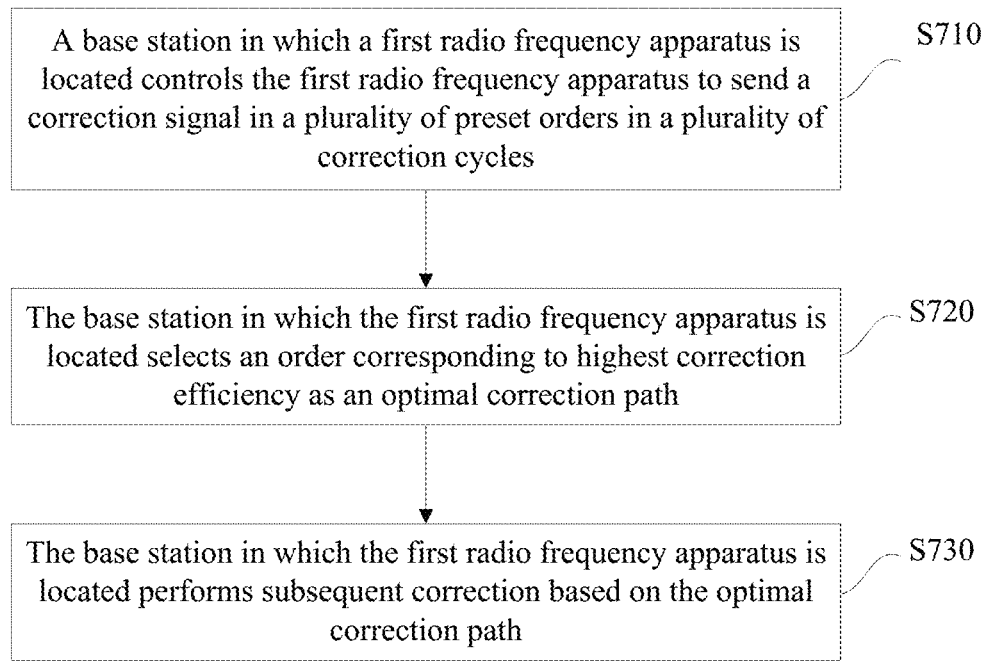
FIG. 7 is a flowchart of determining a correction path in a channel correction method according to an embodiment of this application.

The following describes the foregoing process with reference to FIG. 6 and FIG. 7. FIG. 6 shows a correction process in a correction cycle. Different correction orders may be used in different correction cycles to complete the correction process shown in FIG. 6. A correction order corresponding to optimal correction efficiency is selected as an optimal correction path, and the optimal correction path is stored. The optimal correction path is used in a subsequent correction process to further improve correction efficiency. In addition, the method further includes steps shown in FIG. 7.

S710: The base station where the first radio frequency apparatus is located controls the first radio frequency apparatus to send correction signals in a plurality of preset orders in a plurality of correction cycles, where each order indicates an order for sending correction signals by radio frequency apparatuses in the radio frequency apparatus group to which the first radio frequency apparatus belongs.

S720: The base station where the first radio frequency apparatus is located selects an order corresponding to highest correction efficiency as an optimal correction path.

S730: The base station where the first radio frequency apparatus is located performs subsequent correction based on the optimal correction path.

For a correction process in each correction cycle, refer to the description of FIG. 6, and details are not repeated herein.

In a preferred embodiment, the correction cycle may be further divided into a plurality of time periods, and each time period may be used as a correction sub-cycle. The correction cycle may be used as a long cycle for full correction, in other words, all parameters (also referred to as parametric values) that need to be corrected are corrected. Certainly, most of the parameters (excluding specific parameters corrected in the correction sub-cycle) may alternatively be corrected. For example, amplitude, phase, and the like of each frequency are included. A correction sub-cycle is shorter and may be specifically used to correct a specific parameter, for example, a fast-changing parameter such as an initial phase. In this way, hierarchical correction can be implemented, so that a faster correction cycle for a fast-changing parameter can be achieved, and correction efficiency can be further improved.

It should be noted that the correction cycle may be divided evenly or not, and this is not limited in this application.

In addition, in long-cycle correction, correction resources for different radio frequency apparatus groups may be divided in the time domain, and for correction in a correction sub-cycle, correction resources for different radio frequency apparatus groups may be further divided in the frequency domain. In this way, isolation in the frequency domain between the radio frequency apparatus groups can be further implemented.

The method for performing channel correction between radio frequency apparatuses based on correction signals sent to each other that is known to a person skilled in the art can be applied to the channel correction method in this application; and more methods that are subsequently developed may also be applied to the channel correction method in this application. An example is used now to describe the method for performing channel correction based on a correction signal, and this is not used to limit this application.

Channel correction between a radio frequency apparatus 1 and a radio frequency apparatus 2 is used as an example. A transceiver channel 1 of a cell 1 in a coverage area of the radio frequency apparatuses acts as a reference transceiver channel during correction between the radio frequency apparatus 1 and the radio frequency apparatus 2, and an antenna unit 1 of the cell 1 and an antenna unit 2 of a cell 2 in a coverage area of the radio frequency apparatus 2 act as a transceiver antenna pair for correction. First, the cell 1 is operating in a sending mode, and the cell 2 is operating in a receiving mode. The cell 1 sends a correction signal, and the cell 2 receives the correction signal sent by the cell 1, where the signal received by the cell 2 may be represented as follows:

$$Y_{11,21} = T_{11} * R_{21} * H_{11,21} * S_1 \quad (1)$$

Then, the cell 2 is operating in a sending mode, and the cell 1 is operating in a receiving mode. The cell 2 sends a correction signal, and the cell 1 receives the correction signal sent by the cell 2, where the signal received by the cell 1 may be represented as follows:

$$Y_{21,11} = T_{21} * R_{11} * H_{21,11} * S_2 \quad (2)$$

$S_1$ and $S_2$ are known correction signals, that is, correction signals respectively sent by the cell 1 and the cell 2. Channels between different cell antennas have heterogeneity, that is, $H_{21,11} = H_{11,21}$. A baseband part of the base station uses the received signals to estimate an inter-cell correction compensation coefficient as follows:

$$\frac{Y_{11,21}/S_1}{Y_{21,11}/S_2} = \frac{T_{11} * R_{21}}{T_{21} * R_{11}} = \alpha_{1,2} \quad (3)$$

Then, inter-cell transmit and receive channels are compensated based on the compensation coefficient, and the following formula (4) can be obtained according to the foregoing formula (3):

$$\frac{T_{11}}{T_{21}} = \alpha_{1,2} \frac{T_{21}}{R_{21}} \quad (4)$$

A channel response of the cell 2 is compensated by multiplying each receive channel of the cell 2 by $\alpha_{1,2}$, so that a ratio, of a receive channel response to a transmit channel response, of the cell 1 is the same as that of the cell 2. Alternatively, this may be achieved by dividing each transmit channel of the cell 2 by $\alpha_{1,2}$. $T_{ij}$ represents a transmit channel characteristic of a channel j of a cell i, including a characteristic of an entire transmit channel of a baseband signal processing unit, an intermediate radio frequency unit, and a connection channel between the intermediate radio frequency unit and an antenna unit. $R_{ij}$ represents a receive channel characteristic of the channel j of the cell i, including a characteristic of an entire receive channel of a baseband signal processing unit, an intermediate radio frequency unit, and a connection channel between the intermediate radio frequency unit and an antenna unit. $H_{ij,kl}$ represents an air interface channel response between an antenna unit j of the cell i and an antenna unit l of a cell k. $Y_{ij,kl}$ represents a signal that is sent by a transmit channel j of the cell i and that is received by a receive channel i of the cell k. $S_i$ represents an inter-cell correction reference signal sent by the cell i. $\alpha_{i,k}$ represents an inter-channel correction compensation coefficient of the cell i relative to the cell k.

It should be noted that in the foregoing embodiment, the correction signal may be sent in a guard period (GP) in a time division duplex (TDD) system. In a frequency division duplex (FDD) system, one timeslot may be sacrificed for correction.

The configuration information may be preset on the base station, and the channel correction method is implemented based on the configuration information. The following describes in detail an apparatus for implementing the channel correction method, and the apparatus may be located in a baseband part of the base station or in a radio frequency part of the base station. Preferably, the apparatus is disposed in the baseband part of the base station.

Figure 8:
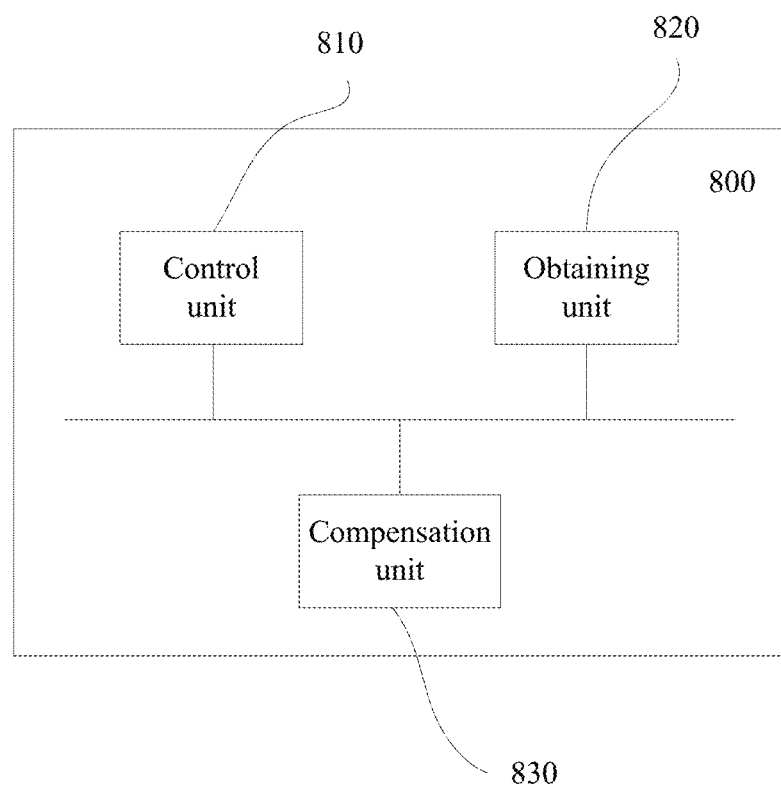
FIG. 8 is a schematic diagram of a channel correction apparatus according to an embodiment of this application.

Referring to FIG. 8, FIG. 8 is a schematic diagram of a channel correction apparatus according to an embodiment of this application. As shown in FIG. 8, the apparatus 800 is configured to perform channel correction on radio frequency apparatuses in a network area, where the radio frequency apparatuses in the network area are divided into at least one radio frequency apparatus group, each radio frequency apparatus group includes a plurality of radio frequency apparatuses, a correction path between the plurality of radio frequency apparatuses is reachable, configuration information is preset on a base station where a first radio frequency apparatus is located, where the configuration information is used to indicate a resource location where each radio frequency apparatus in a radio frequency apparatus group to which the first radio frequency apparatus belongs sends a correction signal, the first radio frequency apparatus is any radio frequency apparatus in the network area, and the channel correction apparatus is located in the base station where the first radio frequency apparatus is located, and includes units for performing the steps of the foregoing channel correction method. For example, the apparatus 800 includes a first control unit 810, an obtaining unit 820, and a compensation unit 830. The first control unit 810 is configured to control, based on the configuration information in a correction cycle, the first radio frequency apparatus to send a first correction signal at a first resource location, and obtain a first received signal, corresponding to the first correction signal, from a second radio frequency apparatus, where the first resource location is a resource location where the first radio frequency apparatus sends the correction signal, and the second radio frequency apparatus is a radio frequency apparatus in the radio frequency apparatus group to which the first radio frequency apparatus belongs. The obtaining unit 820 is configured to obtain, based on the configuration information in the correction cycle, a second received signal at a second resource location through the first radio frequency apparatus, where the second received signal is corresponding to a second correction signal, and the second resource location is a resource location where the second radio frequency apparatus sends the second correction signal. The compensation unit 830 is configured to compensate a channel of the first radio frequency apparatus based on the first correction signal, the second correction signal, the first received signal, and the second received signal.

For grouping cases of the radio frequency apparatuses, descriptions of reuse and staggering of correction resources between groups are the same as those in the foregoing embodiments. For hierarchical correction, that is, dividing a correction cycle into a plurality of correction sub-cycles, descriptions of correction on one or some parameters are also the same as those in the foregoing embodiments. For a quantity of second radio frequency apparatuses and a case that a radio frequency apparatus group includes a radio frequency apparatus where channel correction needs to be performed through an intermediate radio frequency apparatus, descriptions are also the same as those in the foregoing embodiments. Details are not repeated herein.

Figure 9:
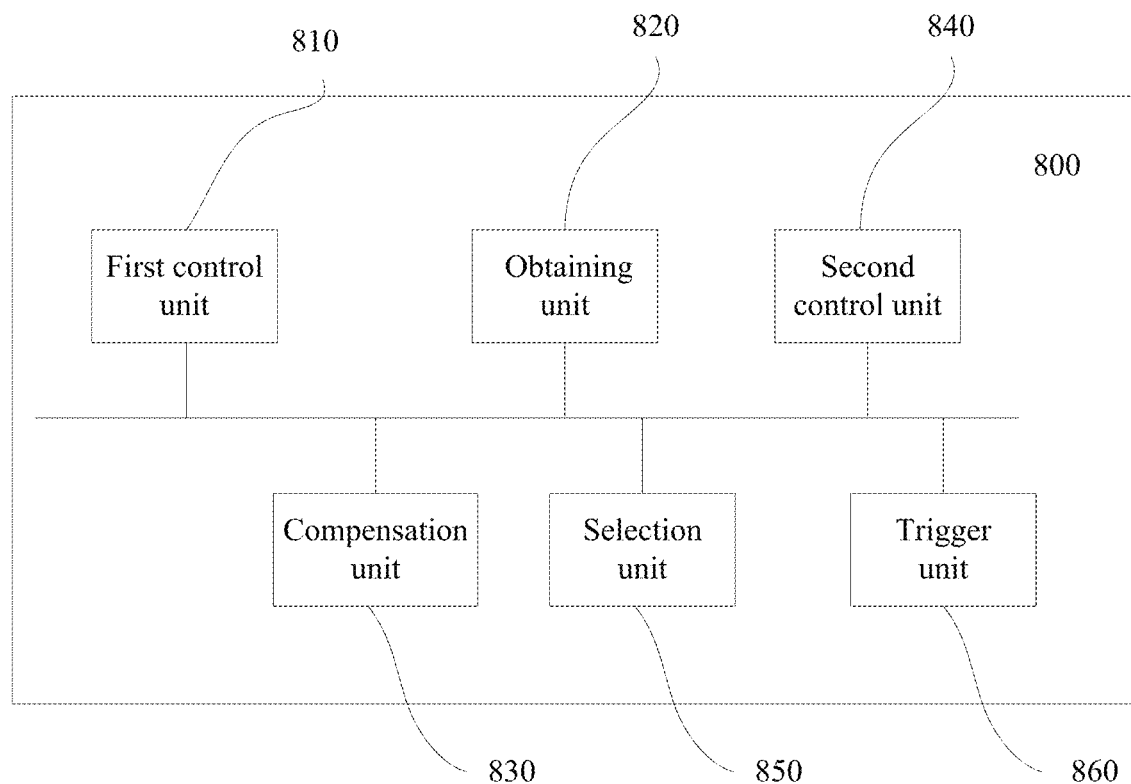
FIG. 9 is a schematic diagram of another channel correction apparatus according to an embodiment of this application.

Similarly, a process of selecting an optimal correction path is the same as that in the foregoing embodiments, and the apparatus 800 may include units for implementing the foregoing steps of selecting an optimal correction path. For example, referring to FIG. 9, the apparatus 800 includes a second control unit 840, a selection unit 850, and a trigger unit 860. The second control unit 840 is configured to control the first radio frequency apparatus to send correction signals in a plurality of preset orders in a plurality of correction cycles, where each order indicates an order for sending correction signals by radio frequency apparatuses in the radio frequency apparatus group to which the first radio frequency apparatus belongs. The selection unit 850 is configured to select an order corresponding to highest correction efficiency as an optimal correction path. The trigger unit 860 is configured to trigger subsequent correction to be performed based on the optimal correction path.

It should be understood that the foregoing division of units is merely logical function division. In actual implementation, some or all of the units may be integrated into one physical entity, or may be physically separated. For example, each unit may be an independent processing element, or may be integrated into a chip of a base station for implementation. In addition, the units may be stored in a memory of the base station in a form of program code, and may be invoked by a processing element of the base station, to execute functions of the units. Moreover, the units may be integrated together or may be implemented independently. The processing element herein may be an integrated circuit chip with a signal processing capability. In an implementation process, the steps in the foregoing method or the units may be implemented by using a hardware integrated logic circuit in the processing element, or by using instructions in a form of software. The processing element may be a general purpose processor, such as a central processing unit (CPU), or may be configured as one or more integrated circuits for implementing the foregoing methods, such as one or more application-specific integrated circuits (ASIC), one or more microprocessors (DSP), or one or more field programmable gate arrays (FPGA), or the like.

Figure 10:
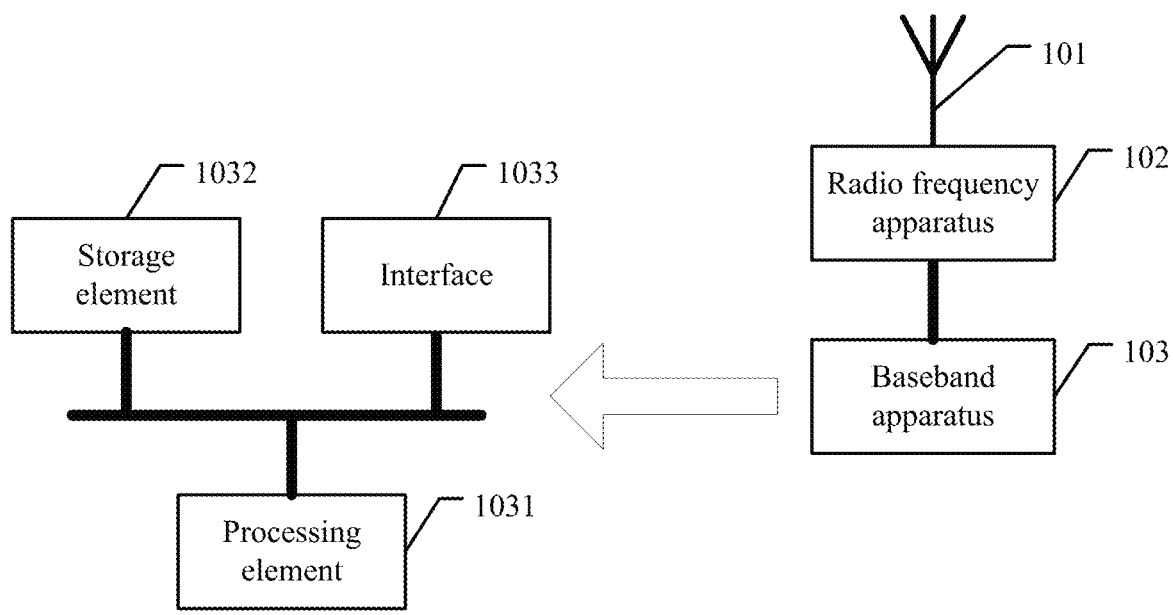
FIG. 10 is a schematic structural diagram of a base station according to an embodiment of this application.

Referring to FIG. 10, FIG. 10 is a schematic structural diagram of a base station according to an embodiment of this application. As shown in FIG. 10, the base station includes an antenna 101, a radio frequency apparatus 102, and a baseband apparatus 103. The antenna 101 is connected to the radio frequency apparatus 102. In an uplink direction, the radio frequency apparatus 102 receives, through the antenna 101, information sent by a terminal, and sends the information sent by the terminal to the baseband apparatus 103 for processing. In a downlink direction, the baseband apparatus 103 processes information of a terminal and sends processed information to the radio frequency apparatus 102. After processing the information of the terminal, the radio frequency apparatus 102 sends processed information to the terminal through the antenna 101.

The channel correction apparatus may be located in the baseband apparatus 103, including a processing element 1031 and a storage element 1032. The baseband apparatus 103 may include, for example, at least one baseband processing board. A plurality of chips are disposed on the baseband processing board. As shown in FIG. 10, one of the chips is, for example, the processing element 1031 and is connected to the storage element 1032, to invoke a program in the storage element 1032 to perform the operations shown in the foregoing method embodiments. The baseband apparatus 103 may further include an interface 1033, configured to exchange information with the radio frequency apparatus 102. For example, the interface is a common public radio interface (CPRI).

For another example, the units may be implemented by using different chips of the baseband apparatus 103, or may be integrated together and implemented by one chip of the baseband apparatus 103. Alternatively, functions of the units may be stored in the storage element of the baseband apparatus 103 in a form of program code and program code is invoked by one processing element of the baseband apparatus 103 to implement the functions of the units.

The processing element herein is the same as described above, may be a general purpose processor, such as a central processing unit (CPU), or may be one or more integrated circuits configured to implement the foregoing method, such as one or more application-specific integrated circuits (ASICs), one or more microprocessors (DSPs), or one or more FPGAs.

The storage element may be a memory or a collective name for a plurality of storage elements.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source through a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A channel correction method for use on radio frequency apparatuses in a network area, wherein the radio frequency apparatuses in the network area are divided into at least one radio frequency apparatus group, each radio frequency apparatus group comprises a plurality of radio frequency apparatuses, a correction path between the plurality of radio frequency apparatuses is reachable, configuration information is preset on a base station where a first radio frequency apparatus is located for indicating a resource location where each radio frequency apparatus in a radio frequency apparatus group to which the first radio frequency apparatus belongs sends a correction signal, and the first radio frequency apparatus is in the network area, the method comprising:

controlling, by the base station based on the configuration information in a correction cycle, the first radio frequency apparatus to send a first correction signal at a first resource location, and obtaining a first received signal, corresponding to the first correction signal, from a second radio frequency apparatus, wherein the first resource location is a resource location where the first radio frequency apparatus sends the first correction signal, and the second radio frequency apparatus is a radio frequency apparatus in the radio frequency apparatus group to which the first radio frequency apparatus belongs;

obtaining, by the base station based on the configuration information in the correction cycle, a second received signal, wherein the second received signal corresponds to a second correction signal that is sent by the second radio frequency apparatus at a second resource location; and compensating, by the base station, a channel of the first radio frequency apparatus based on the first correction signal, the second correction signal, the first received signal, and the second received signal.

2. The method according to claim 1, wherein the correction cycle comprises at least one correction sub-cycle, the correction sub-cycle is a time period in the correction cycle, and the correction sub-cycle is used for performing correction on a specific parameter.

3. The method according to claim 1, wherein:
when the radio frequency apparatuses in the network area are divided into a plurality of radio frequency apparatus groups, the plurality of radio frequency apparatus groups comprise a first radio frequency apparatus group and a second radio frequency apparatus group;
isolation between the first radio frequency apparatus group and the second radio frequency apparatus group meets a preset requirement; and
a radio frequency apparatus in the first radio frequency apparatus group and a radio frequency apparatus in the second radio frequency apparatus group use a same resource to send a correction signal.

4. The method according to claim 1, wherein:
when the radio frequency apparatuses in the network area are divided into a plurality of radio frequency apparatus groups, the plurality of radio frequency apparatus groups comprise a third radio frequency apparatus group and a fourth radio frequency apparatus group;
isolation between the third radio frequency apparatus group and the fourth radio frequency apparatus group does not meet a preset requirement; and
a radio frequency apparatus in the third radio frequency apparatus group and a radio frequency apparatus in the fourth radio frequency apparatus group use different resources to send a correction signal.

5. The method according to claim 1 wherein the radio frequency apparatuses in the network area are divided into at least one radio frequency apparatus group based on a grouping factor, and the grouping factor comprises one or more of the following factors: an isolation requirement, a maximum spacing between the radio frequency apparatuses, a group size, and a maximum quantity of layers.

6. The method according to claim 1, wherein when the radio frequency apparatuses in the network area are divided into a plurality of radio frequency apparatus groups, a group identifier is assigned to each radio frequency apparatus group.

7. The method according to claim 6, wherein group identifier mod N operation results of radio frequency apparatus groups, between which isolation meets a preset requirement, are the same; and group identifier mod N operation results of radio frequency apparatus groups, between which isolation does not meet a preset requirement, are different, wherein N represents a quantity of radio frequency apparatus groups in a correction cycle.

8. The method according to claim 7, wherein:
the group identifier is used for allocation of correction resources between the radio frequency apparatus groups; and
a criterion for the allocation of the correction resources between the radio frequency apparatus groups comprises: a same correction resource is allocated to radio frequency apparatus groups whose group identifier mod N operation results are the same, and different correction resources are allocated to radio frequency apparatus groups whose group identifier mod N operation results are different.

9. The method according to claim 1, further comprising:
controlling, by the base station, the first radio frequency apparatus to send correction signals in a plurality of preset orders in a plurality of correction cycles, wherein each order indicates an order for sending correction signals by radio frequency apparatuses in the radio frequency apparatus group to which the first radio frequency apparatus belongs;
selecting, by the base station, an order corresponding to highest correction efficiency as an optimal correction path; and
performing, by the base station, subsequent correction based on the optimal correction path.

10. A channel correction apparatus for performing channel correction on radio frequency apparatuses in a network area, wherein the radio frequency apparatuses in the network area are divided into at least one radio frequency apparatus group, each radio frequency apparatus group comprises a plurality of radio frequency apparatuses, a correction path between the plurality of radio frequency apparatuses is reachable, configuration information is preset on a base station where a first radio frequency apparatus is located for indicating a resource location where each radio frequency apparatus in a radio frequency apparatus group to which the first radio frequency apparatus belongs sends a correction signal, and the first radio frequency apparatus is in the network area, the channel correction apparatus comprising:
a processor; and
a non-transitory computer readable storage medium, the non-transitory computer readable storage medium storing a program which, when executed by the processor, causes the apparatus to:
control, based on the configuration information in a correction cycle, the first radio frequency apparatus to send a first correction signal at a first resource location, and obtain a first received signal, corresponding to the first correction signal, from a second radio frequency apparatus, wherein the first resource location is a resource location where the first radio frequency apparatus sends the first correction signal, and the second radio frequency apparatus is a radio frequency apparatus in the radio frequency apparatus group to which the first radio frequency apparatus belongs;
obtain, based on the configuration information in the correction cycle, a second received signal, wherein the second received signal corresponds to a second correction signal that is sent by the second radio frequency apparatus at a second resource location; and
compensate a channel of the first radio frequency apparatus based on the first correction signal, the second correction signal, the first received signal, and the second received signal.

11. The apparatus according to claim 10, wherein the correction cycle comprises at least one correction sub-cycle, the correction sub-cycle is a time period in the correction cycle, and the correction sub-cycle is used for performing correction on a specific parameter.

12. The apparatus according to claim 10, wherein:
when the radio frequency apparatuses in the network area are divided into a plurality of radio frequency apparatus groups, the plurality of radio frequency apparatus groups comprises a first radio frequency apparatus group and a second radio frequency apparatus group;
isolation between the first radio frequency apparatus group and the second radio frequency apparatus group meets a preset requirement; and
a radio frequency apparatus in the first radio frequency apparatus group and a radio frequency apparatus in the second radio frequency apparatus group use a same resource to send a correction signal.

13. The apparatus according to claim 10, wherein:
when the radio frequency apparatuses in the network area are divided into a plurality of radio frequency apparatus groups, the plurality of radio frequency apparatus groups comprise a third radio frequency apparatus group and a fourth radio frequency apparatus group;

isolation between the third radio frequency apparatus group and the fourth radio frequency apparatus group does not meet a preset requirement; and a radio frequency apparatus in the third radio frequency apparatus group and a radio frequency apparatus in the fourth radio frequency apparatus group use different resources to send a correction signal.

14. The apparatus according to claim 10, wherein the radio frequency apparatuses in the network area are divided into at least one radio frequency apparatus group based on a grouping factor, and the grouping factor comprises one or more of the following factors: an isolation requirement, a maximum spacing between the radio frequency apparatuses, a group size, and a maximum quantity of layers.

15. The apparatus according to claim 10, wherein when the radio frequency apparatuses in the network area are divided into a plurality of radio frequency apparatus groups, and a group identifier is assigned to each radio frequency apparatus group.

16. The apparatus according to claim 15, wherein group identifier mod N operation results of radio frequency apparatus groups, between which isolation meets a preset requirement, are the same; and group identifier mod N operation results of radio frequency apparatus groups, between which isolation does not meet a preset requirement, are different, wherein N represents a quantity of radio frequency apparatus groups in a correction cycle.

17. The apparatus according to claim 16, wherein the group identifier is used for allocation of correction resources between the radio frequency apparatus groups.

18. The apparatus according to claim 17, wherein a criterion for the allocation of the correction resources between the radio frequency apparatus groups comprises: a same correction resource is allocated to radio frequency apparatus groups whose group identifier mod N operation results are the same, and different correction resources are allocated to radio frequency apparatus groups whose group identifier mod N operation results are different.

19. The apparatus according to claim 10, wherein the program, when executed by the processor, further cause the apparatus to:

control the first radio frequency apparatus to send correction signals in a plurality of preset orders in a plurality of correction cycles, wherein each order indicates an order for sending correction signals by radio frequency apparatuses in the radio frequency apparatus group to which the first radio frequency apparatus belongs;

select an order corresponding to highest correction efficiency as an optimal correction path; and trigger subsequent correction to be performed based on the optimal correction path.

20. A communications system, comprising:

at least one base station, wherein radio frequency apparatuses of the at least one base station are divided into at least one radio frequency apparatus group, each radio frequency apparatus group comprises a plurality of radio frequency apparatuses, a correction path between the plurality of radio frequency apparatuses is reachable, configuration information is preset on the at least one base station where a first radio frequency apparatus is located for indicating a resource location where each radio frequency apparatus in a radio frequency apparatus group to which the first radio frequency apparatus belongs sends a correction signal, and the at least one base station comprises:

a processor; and a non-transitory computer readable storage medium, the non-transitory computer readable storage medium storing a program which, when executed by the processor, causes the at least one base station to:

control, based on the configuration information in a correction cycle, the first radio frequency apparatus to send a first correction signal at a first resource location, and obtain a first received signal, corresponding to the first correction signal, from a second radio frequency apparatus, wherein the first resource location is a resource location where the first radio frequency apparatus sends the first correction signal, and the second radio frequency apparatus is a radio frequency apparatus in the radio frequency apparatus group to which the first radio frequency apparatus belongs, obtain, based on the configuration information in the correction cycle, a second received signal, wherein the second received signal corresponds to a second correction signal that is sent by the second radio frequency apparatus at a second resource location, and compensate a channel of the first radio frequency apparatus based on the first correction signal, the second correction signal, the first received signal, and the second received signal.

* * * * *